United States Patent
Huang

(10) Patent No.: US 6,883,208 B1
(45) Date of Patent: Apr. 26, 2005

(54) HEDGE SHEAR EXTENDABLE HANDLE ENHANCED STRUCTURE

(76) Inventor: Yao-Chung Huang, P.O. Box 453, Taichung (TW)

( * ) Notice: Subject to any disclaimer, the term of this patent is extended or adjusted under 35 U.S.C. 154(b) by 0 days.

(21) Appl. No.: 10/400,683

(22) Filed: Mar. 28, 2003

(51) Int. Cl.$^7$ .............................................. A45C 13/22
(52) U.S. Cl. ..................... 16/429; 16/426; 16/DIG. 41; 16/110.1
(58) Field of Search ................................. 16/429, 113.1, 16/436, DIG. 25, DIG. 41, 405, 427, 110.1; 403/901.4, 901.1; 15/144.4, 143.1, DIG. 10

(56) References Cited

U.S. PATENT DOCUMENTS

| | | | | |
|---|---|---|---|---|
| 2,818,290 A | * | 12/1957 | Harocopo | 403/108 |
| 4,409,866 A | * | 10/1983 | McBride | 81/177.2 |
| 5,220,707 A | * | 6/1993 | Newman et al. | 16/429 |
| 5,228,202 A | * | 7/1993 | Liao | 30/249 |
| 5,404,616 A | * | 4/1995 | Carmien | 16/422 |
| 5,579,558 A | * | 12/1996 | Newman et al. | 16/429 |
| 5,593,196 A | * | 1/1997 | Baum et al. | 294/19.1 |
| 5,729,865 A | * | 3/1998 | Stoddart | 16/429 |
| 5,983,455 A | * | 11/1999 | Polzin et al. | 16/429 |
| 6,223,628 B1 | * | 5/2001 | Barron | 81/53.11 |
| 6,345,445 B1 | * | 2/2002 | Schofield | 30/249 |
| 6,546,596 B2 | * | 4/2003 | Grote et al. | 16/429 |

* cited by examiner

Primary Examiner—Suzanne Dino Barrett
Assistant Examiner—Mark Williams
(74) Attorney, Agent, or Firm—Alan D. Kamrath; Nikolai & Mersereau, P.A.

(57) ABSTRACT

This innovation provides a hedge shear extendable handle enhanced structure focusing on resolving the operating inconvenience and physical deficiencies such as bending and deformation resulting from the operations of legendary hedge shear. The main structure of the enhancement is a pivot joint formation of an inner and outer tube. The main feature is the H-shape profile structure of the inner tube with a slide way built with an internal diffusion slot and a perforation slot. The perforation slot has a few interleaved positioning fillisters along the slide way. The positioning fillisters in the inner tube will park the sliding block when it shifted upward and matching with the locating block on the top pillar while moving upward. A press button assembles on top of the pillar and remains in an upward position with the sliding block under normal condition with the help of a spring. The main functionality is retaining the convenience of the press button operation while maintaining ruggedness and endurance of the product using such technique.

1 Claim, 7 Drawing Sheets

HEDGE SHEAR EXTENDABLE HANDLE ENHANCED STRUCTURE

BACKGROUND OF THE INVENTION

1. Field of the Invention

This innovation pertains to a hedge shear structure, especially to the new multidimensional architecture of the positioning switching mechanism of the extendable tube.

2. Description of Related Art

To accommodate different cutting span, generic hedge shears have an extendable and adjustable structure. Traditional hedge shears use eccentric rotating method to achieve the purpose of positioning and switchable adjustments. However, such operating method can cause slacks as user applies forces opposite to the rotating direction during operation causing deficiencies such as loosening and disengaging. Another legendary switching method is achievable by pushing the sliding positioning button, such method is preferable than the previous but involved continuous switching and sliding to achieve positioning and switchable adjustments is not ideal in terms of operation conveniences and requires future enhancements. On the other hand, the profile structure of the existing hedge shear is either circular or oval and is prone to physical deficiencies such as bending and deformation cause by structural strength issues after long operating durations.

Thus, how to develop an ideal and practical hedge shear extendable handle structure are the expectation of the users and the development goal of the industry.

BRIEF SUMMARY OF THE INVENTION

1. Implementing the press button switching operation mode to achieve enhancement in convenience.
2. When press the button is pressed, user can release the press button without continuously pressing and adjust the inner tube until the positioning block is matching again with the next available positioning fillisters to regain fasten position.
3. The tube body is a H-shape profile structure enforced with anti-bending effort to achieve strength and ruggedness.

BRIEF DESCRIPTION OF TILE DRAWINGS

DETAILED DESCRIPTION OF THE INVENTION

Figure 7:
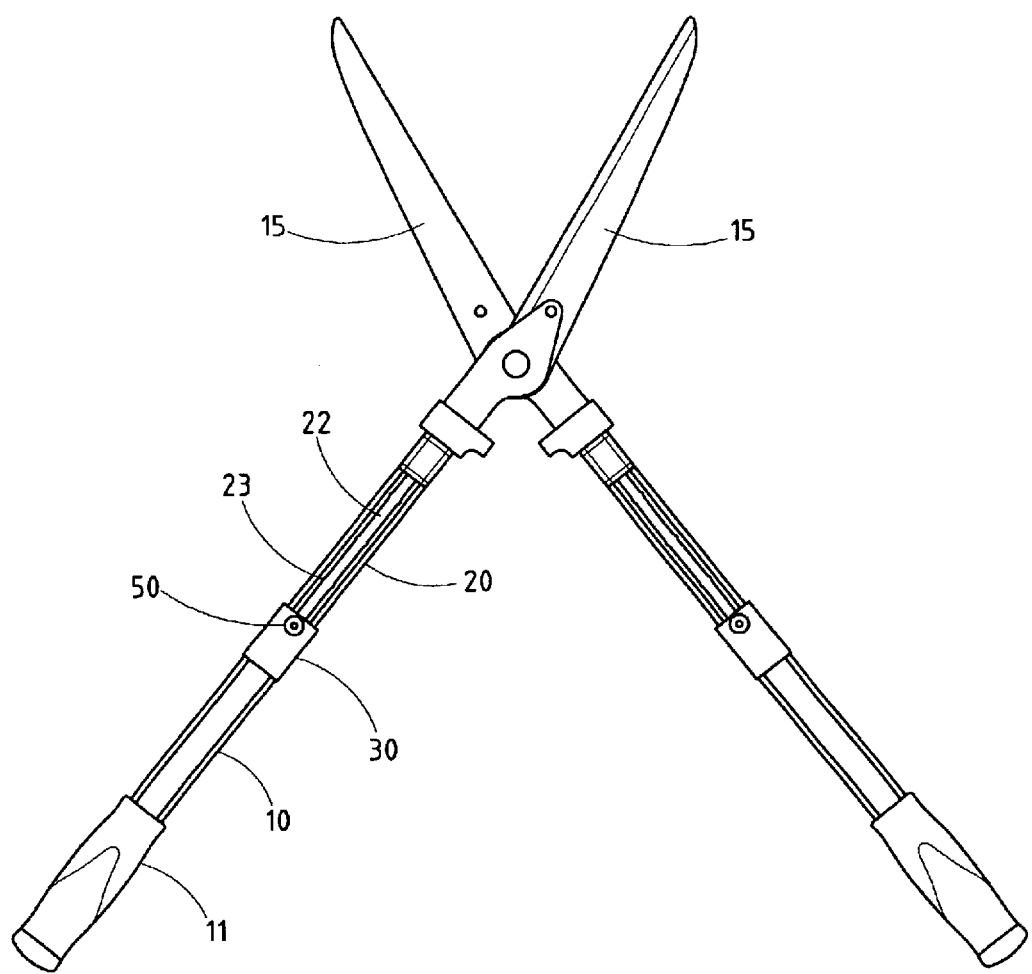
FIG. 7 shows a plan view of a pair of the extendable tube structure innovations disposed on a pair of hedge shears.

To facilitate your honor, the patent examiner to have a further understanding and clarification on the purpose, characteristics and functionality of this innovation, please reference the listed figures with the detail descriptions as follow:

First, please reference illustrations in FIGS. 1, 2, 3 and 4 as the prefer implementation example of this innovative hedge shear extendable handle enhanced structure, includes:

An outer tube 10: One side of the outer tube is use for the integration with the handle 11 assembly (FIG. 7) while a wide opening is present on the other side with a preset perforation 12. A locating tube 13 is present on one side of the outer tube 10. On the locating tube 13, a puncture 14 is located on the location matching the perforation 12 location of the outer tube.

An inner tube 20: One side of the H-shape profile structure inner tube is use to connect to the hedge shear blade 15 (FIG. 7) while the other side is pivot joint with the outer tube 10. A dovetail groove is located on the inner tube corresponding to the perforation location on the outer tube. The construction of the dovetail groove is so that when viewing through the profile diagram, it is a combination of an internal diffusion slot 21 with a one-size shrinkage perforation slot 22. The perforation slot 22 has a few interleaved positioning fillisters 23 along the slide way. An expanded diameter damper block 24 is located on the side where the inner tube 20 pivot joint with outer tube 10 to prevent the inner tube 20 from disengaging the locating tube 13.

A core tube 30 is female joint on the perimeter of the outer tube 10 with a perforation slot 31 corresponding to the perforation 12 on the outer tube 10.

A sliding block 40 is sliding joint with the inner diffusion slot 21 on the inner tube 20 with axial and radial displacement allowance. On top of the sliding block 40 is a pillar 41 protruding through perforation slot 22, puncture 14, perforation 12 and perforation slot 31. A locating block 42 situated between the sliding block 40 and the pillar 41 and used to secure the outer 10 and inner tube 20 in a fix position when the sliding block 40 shifted upward and locked with the positioning fillisters 23 on the perforation slot 22 of the inner tube.

A press button 50 is installed on the top of the pillar 41 on the sliding block 40 by means of the binding post 51 located on the bottom.

A spring 60 is assembled between the press button 50 and the core tube 30 to push the press button 50 to an upward position with the sliding block 40 under normal condition. The core tube 30 also provides a protruding ring 32 on the perimeter of the perforation slot 31 to tightly fasten the spring 30 bottom. A fixing pivot 43 is located on the center of the sliding block 40 pillar 41 to form a fixing edge 52 with the binding post 51 on the bottom of the press button 50. A cotter block 53 is piercing radially through the press button 50, then the binding post 51. The cotter block stops at the bottom of the sliding block 40 fixing pivot 43 securing the press button 50 and sliding block 40.

Figure 1:
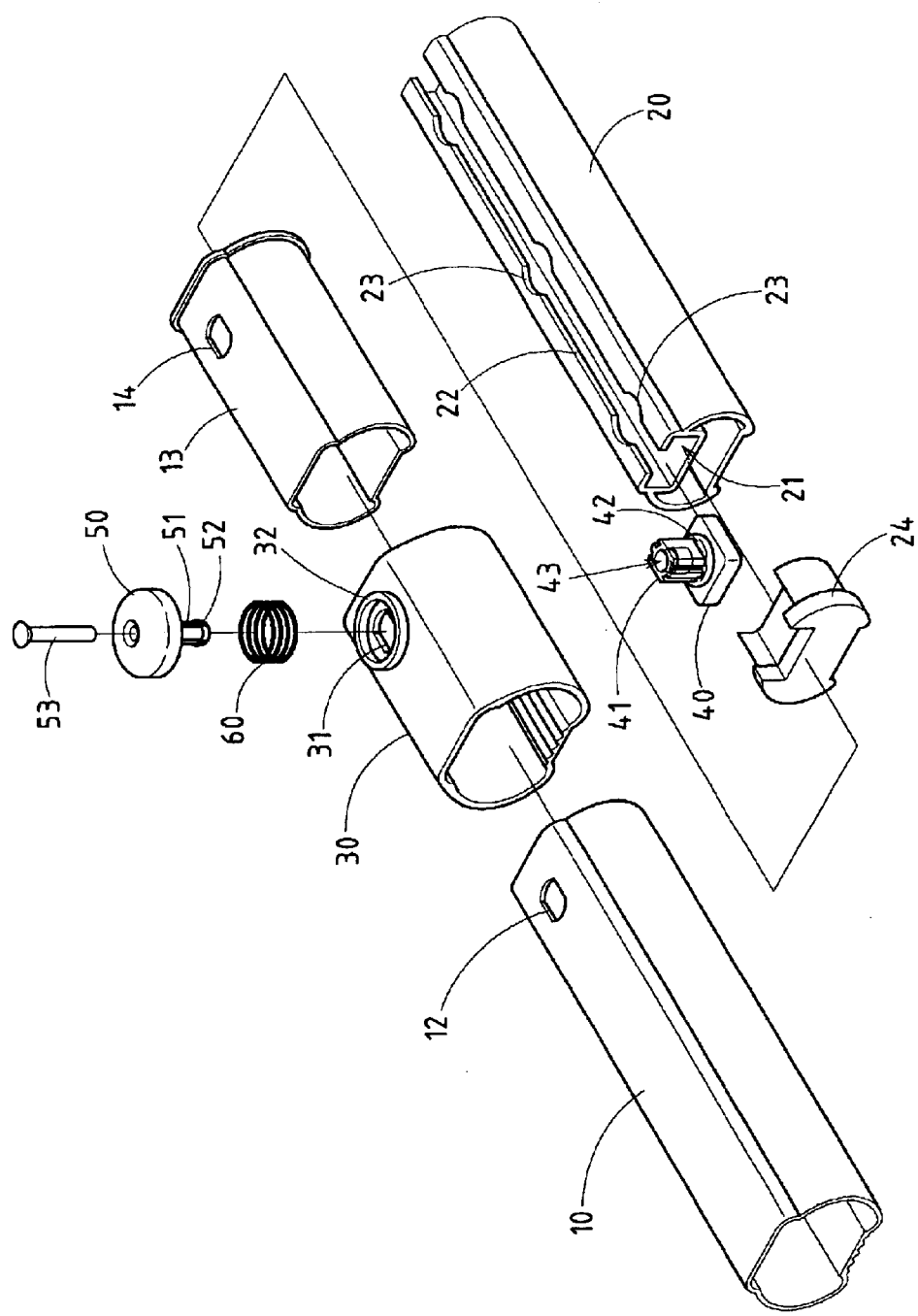
FIG. 1 shows an exploded perspective view of the extendable tube structure innovation.
Figure 2:
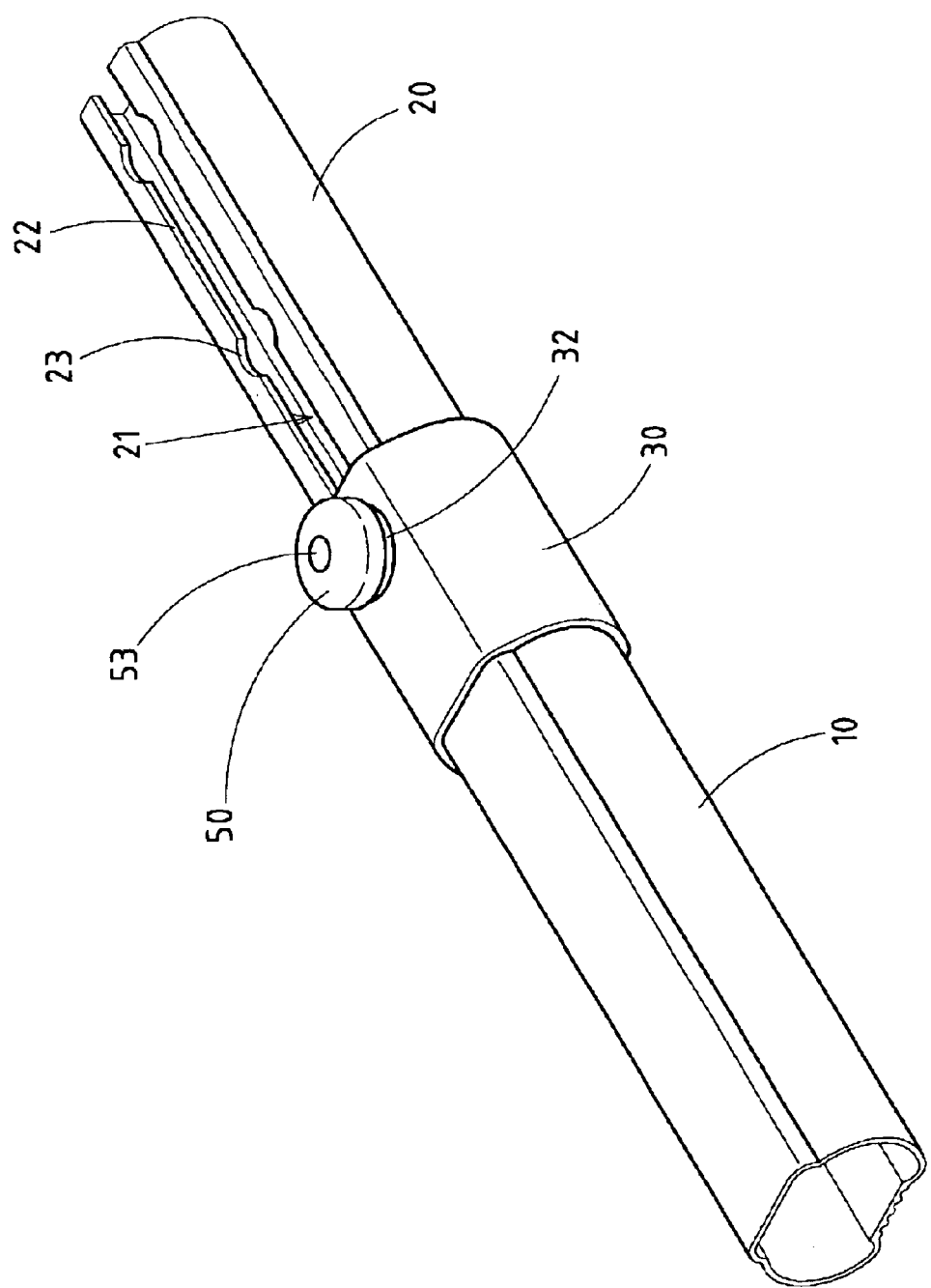
FIG. 2 shows a perspective view of the extendable tube structure innovation in an assembled condition.
Figure 3:
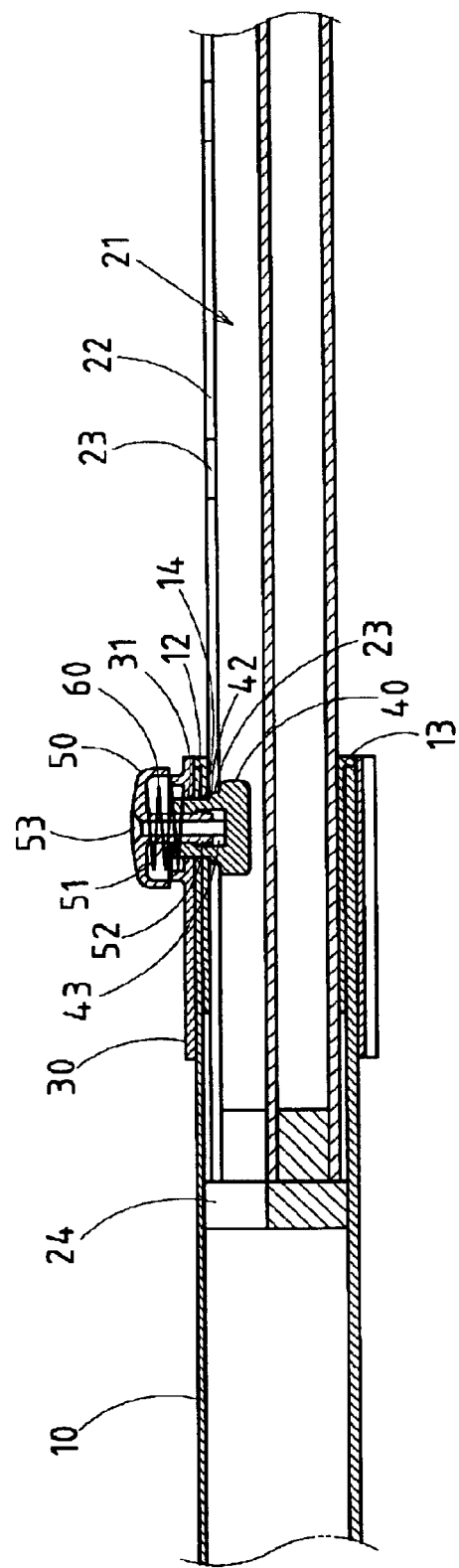
FIG. 3 shows a cross sectional view of the extendable tube structure innovation in the fasten position.
Figure 4:
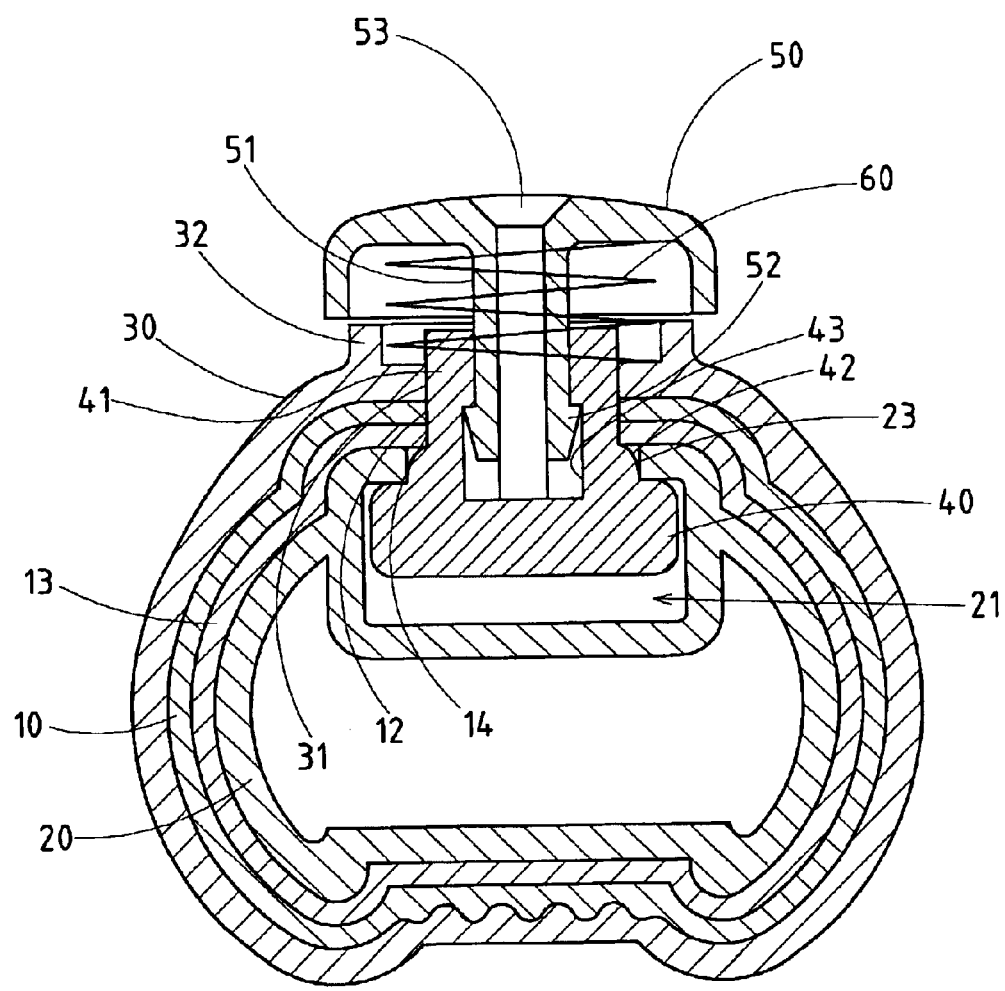
FIG. 4 shows a cross sectional view of the extendable tube structure innovation perpendicular to the cross sectional view of FIG. 3.

The theory and operations of this innovation is describe as follow:

Please reference FIGS. 3 and 4 for the illustration of the extendable tube in the fasten position. As the press button 50 is push upward by the elasticity of the spring 60 with the sliding block 40 under normal condition, the locating block 42 on top of the sliding block 40 will position and locked with the protruding ring 23 on the perforation slot 22 of the inner tube 20. This will put the inner tube in a fasten position and prevent it from extending.

Figure 5:
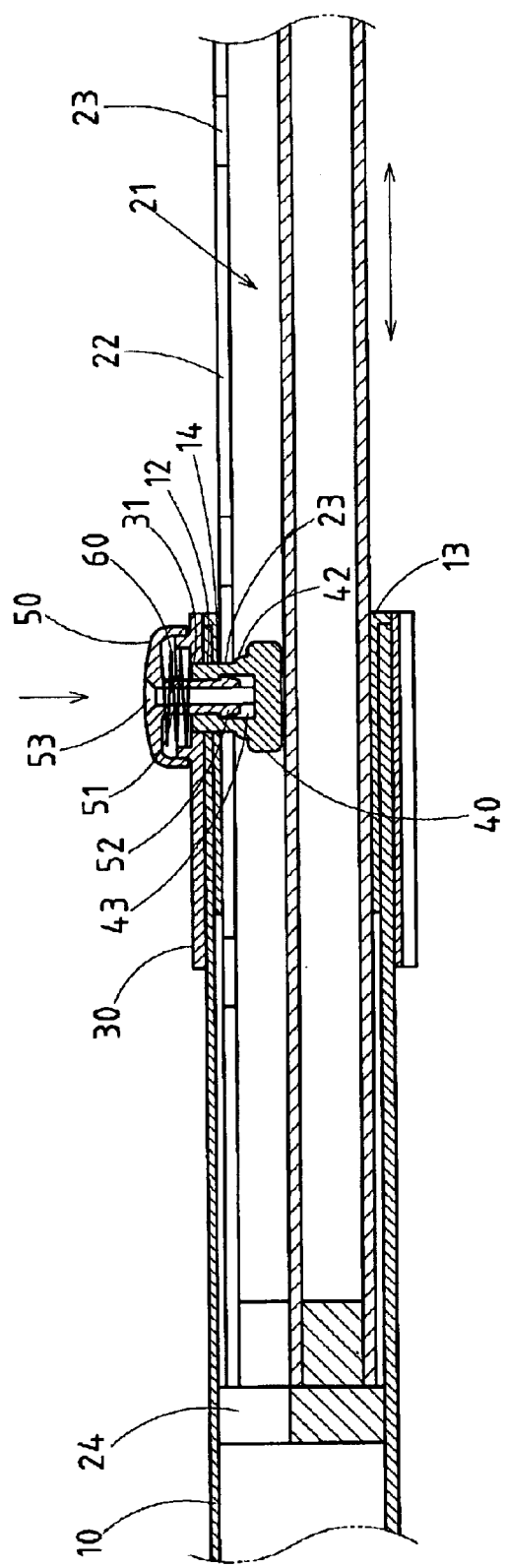
FIG. 5 shows a cross sectional view of the extendable tube structure innovation in the adjustable position.
Figure 6:
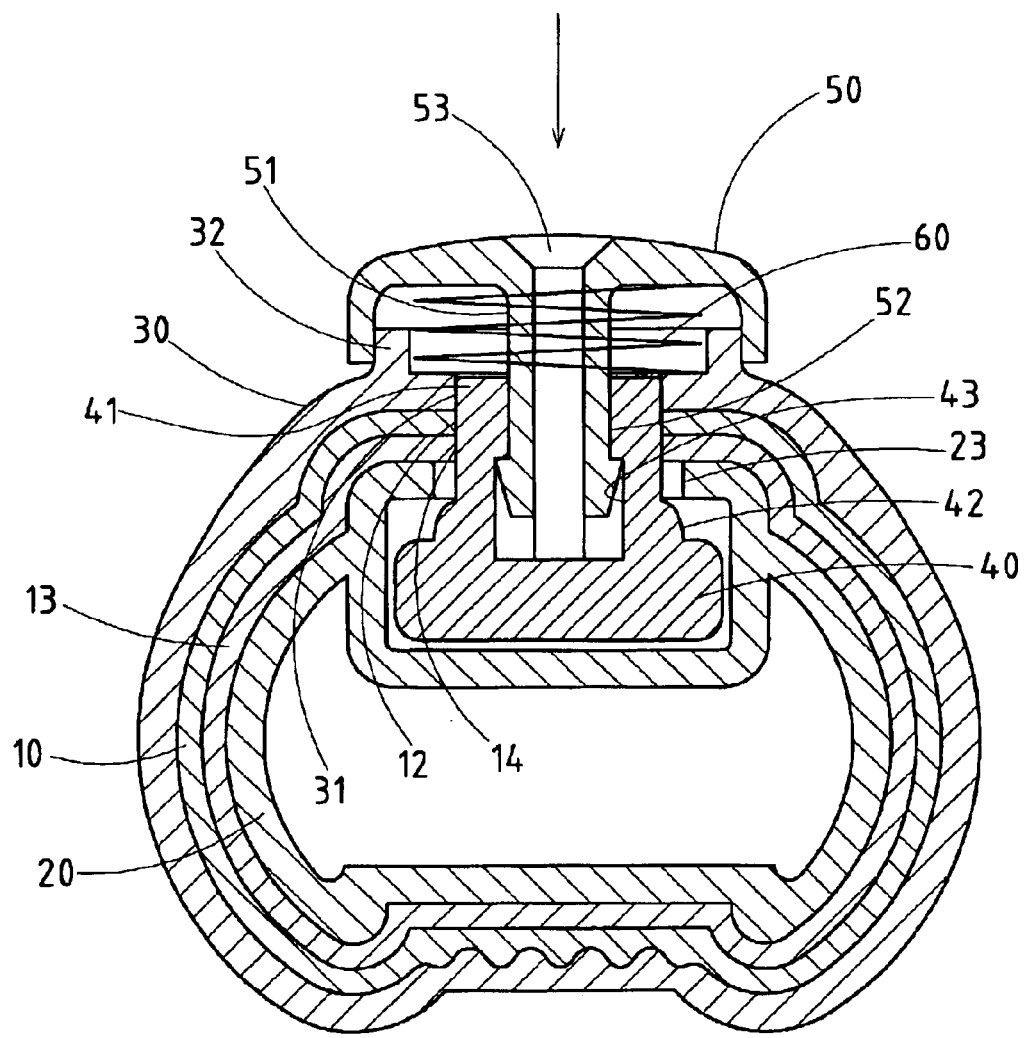
FIG. 6 shows a cross sectional view of the extendable tube structure innovation perpendicular to the cross sectional view of FIG. 5.

Please further reference FIGS. 5 and 6 for the illustration of the extendable tube in an adjustable position. To adjust the length of the inner tube 20, user only needs to press down the press button 50. This will lower the positioning block 42 on the sliding block 40 and disengage from the positioning fillisters 23 of the inner tube 20. In the meantime, user only needs to push or pull the inner tube 20 to make necessary adjustments. When the positioning block 42 is disengage from the positioning fillisters 23, user can release the press button 50 without continuously pressing and adjust the inner tube 20 until the positioning block 42 is matching again with the next available positioning fillisters 23 to regain fasten position.

I claim:

1. A hedge shear extendable handle structure, includes:

an outer tube having a first side combined with a handle assembly and a second side formed with a perforation;

a locating tube mounted in the second side of the outer tube and formed with a puncture aligning with the perforation of the outer tube;

an inner tube having a first side connected to a hedge shear blade and a second side combined with the outer tube;

a dovetail groove formed in the inner tube corresponding to the perforation of the outer tube and including an internal diffusion slot with a one-size shrinkage perforation slot having a slide way formed with a plurality of interleaved positioning fillisters;

an expanded diameter damper block mounted between the inner tube and the outer tube to prevent the inner tube from disengaging the locating tube;

a core tube mounted on a perimeter of the outer tube and formed with a perforation slot corresponding to the perforation of the outer tube;

a sliding block mounted in the diffusion slot of the inner tube with axial and radial displacement allowance;

a pillar mounted on a top of the sliding block and extended through the perforation slot of the inner tube, the puncture of the locating tube, the perforation of the outer tube and the perforation slot of the core tube;

a locating block mounted between the sliding block and the pillar to secure the outer tube and the inner tube in a fix position when the sliding block is shifted upward and locked in one of the positioning fillisters of the inner tube;

a press button installed on a top of the pillar on the sliding block by a binding post located on a bottom of the press button; and a spring biased between the press button and the core tube to push the press button to an upward position with the sliding block under a normal condition.

* * * * *